US008437782B2

(12) United States Patent
Bergqvist et al.

(10) Patent No.: US 8,437,782 B2
(45) Date of Patent: May 7, 2013

(54) METHOD FOR CONTACTING A GROUP OF TERMINALS WITHIN A COMMUNICATION NETWORK, ARRANGEMENT AND TERMINAL WITHIN A COMMUNICATION NETWORK

(75) Inventors: Jens Bergqvist, Linköping (SE); Andreas Bergström, Vikingstad (SE); Paul Schliwa-Bertling, Ljungsbro (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 9 days.

(21) Appl. No.: 13/504,017

(22) PCT Filed: Sep. 9, 2010

(86) PCT No.: PCT/SE2010/050955
§ 371 (c)(1),
(2), (4) Date: Apr. 25, 2012

(87) PCT Pub. No.: WO2011/053219
PCT Pub. Date: May 5, 2011

(65) Prior Publication Data
US 2012/0214520 A1    Aug. 23, 2012

Related U.S. Application Data

(60) Provisional application No. 61/256,406, filed on Oct. 30, 2009.

(51) Int. Cl.
*H04W 68/00* (2009.01)
(52) U.S. Cl.
USPC ............ 455/458; 455/466; 455/518; 455/567

(58) Field of Classification Search ........... 455/458, 455/515, 426.1, 422.1, 450, 509, 466, 517–521, 455/567; 340/7.1–7.29; 370/328, 338
See application file for complete search history.

(56) References Cited

U.S. PATENT DOCUMENTS 5,625,886 A * 4/1997 Raes ............................ 455/519
5,655,215 A * 8/1997 Diachina et al. ........... 455/426.1
(Continued)

FOREIGN PATENT DOCUMENTS
EP          2088824 A1    8/2009
WO   2006/1113616 A1   10/2006

OTHER PUBLICATIONS

European Telecommunications Standards Institute. ETSI TS 144 018, V8.6.0 (Apr. 2009). Digital cellular telecommunications system (Phase 2+); Mobile radio interface layer 3 specification; Radio Resource Control (RRC) protocol (3GPP TS 44.018 version 8.6.0 Release 8). Apr. 2009.

(Continued)

*Primary Examiner* — Sharad Rampuria
(74) *Attorney, Agent, or Firm* — Murphy, Bilak & Homiller, PLLC

(57) ABSTRACT

The present invention relates to the field of paging terminals within a communication network. In order to contact a group of terminals, a common group identification is allocated to each of the terminals within said group. Thereafter, a paging message is created comprising said common group identification. The paging message is then transmitted to all terminals within said group by a single paging operation.

13 Claims, 2 Drawing Sheets

U.S. PATENT DOCUMENTS

| | | | |
|---|---|---|---|
| 5,835,860 A * | 11/1998 | Diachina | 455/458 |
| 5,923,649 A * | 7/1999 | Raith | 370/328 |
| 6,039,624 A * | 3/2000 | Holmes | 455/403 |
| 6,097,942 A * | 8/2000 | Laiho | 455/414.1 |
| 6,175,743 B1 * | 1/2001 | Alperovich et al. | 455/466 |
| 6,449,491 B1 * | 9/2002 | Dailey | 455/518 |
| 7,415,281 B2 * | 8/2008 | Ahn | 455/466 |
| 7,499,418 B2 * | 3/2009 | Oprescu-Surcobe et al. | 370/311 |
| 8,077,677 B2 * | 12/2011 | Wang et al. | 370/332 |
| 8,190,181 B2 * | 5/2012 | Wu et al. | 455/466 |
| 2003/0076812 A1 * | 4/2003 | Benedittis | 370/350 |
| 2004/0023672 A1 | 2/2004 | Terry | |
| 2004/0152476 A1 | 8/2004 | Kuwano et al. | |
| 2006/0046762 A1 * | 3/2006 | Yoon et al. | 455/519 |
| 2006/0155860 A1 * | 7/2006 | Funato et al. | 709/228 |
| 2006/0251033 A1 * | 11/2006 | Oprescu-Surcobe et al. | 370/338 |
| 2008/0207229 A1 * | 8/2008 | Cave et al. | 455/458 |
| 2009/0181701 A1 * | 7/2009 | Willey et al. | 455/458 |
| 2009/0233634 A1 * | 9/2009 | Aghili et al. | 455/466 |
| 2010/0016007 A1 * | 1/2010 | Satake | 455/518 |
| 2010/0081437 A1 * | 4/2010 | Beckmann et al. | 455/435.1 |
| 2010/0099439 A1 * | 4/2010 | Aghili et al. | 455/458 |
| 2010/0279715 A1 * | 11/2010 | Alanara et al. | 455/458 |
| 2011/0128911 A1 * | 6/2011 | Shaheen | 370/328 |
| 2011/0134841 A1 * | 6/2011 | Shaheen | 370/328 |

OTHER PUBLICATIONS

3rd Generation Partnership Project. 3GPP TS 23.003 V9.3.0 (Jun. 2010). 3rd Generation Partnership Project; Technical Specification Group Core Network and Terminals; Numbering, addressing and identification (Release 9). Jun. 2010.

European Telecommunications Standards Institute. Digital Cellular Telecommunications System (Phase 2+);Numbering, Addressing and Identification (GSM 03.03). GSM Technical Specification. Mar. 1996, pp. 1-22, Version 5.0.0.

* cited by examiner

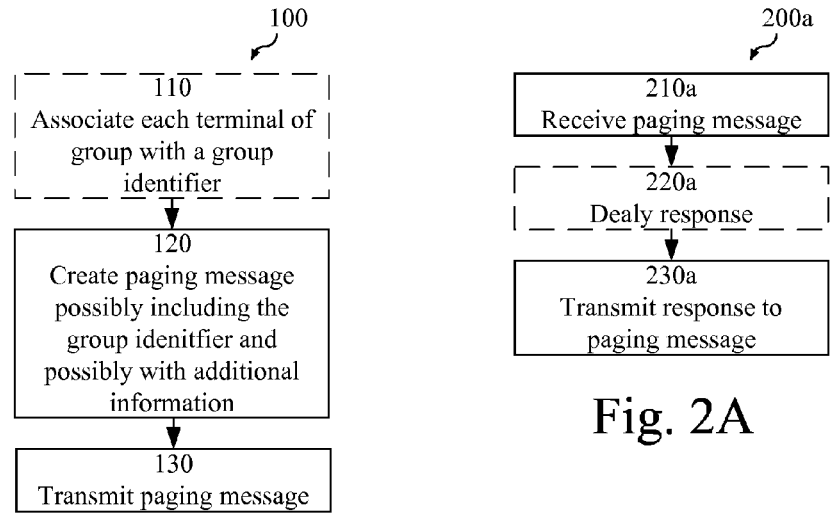
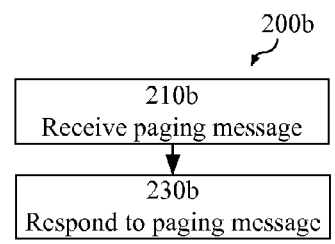
Fig. 2A
Fig. 1
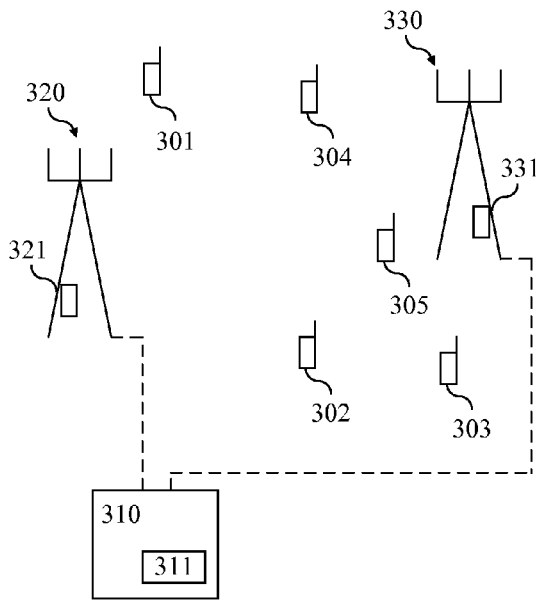
Fig. 3A
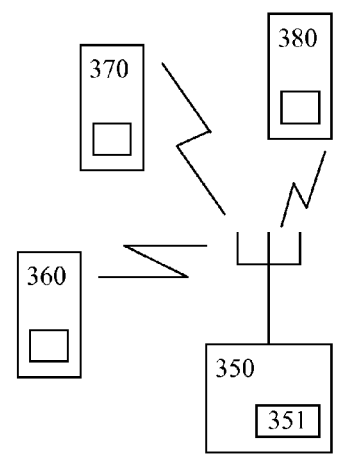
Fig. 3B

METHOD FOR CONTACTING A GROUP OF TERMINALS WITHIN A COMMUNICATION NETWORK, ARRANGEMENT AND TERMINAL WITHIN A COMMUNICATION NETWORK

TECHNICAL FIELD

The present invention relates generally to the field of contacting terminals of a network. More particularly, the present invention relates to a method and an arrangement for contacting a group of terminals within a communication network, a method in a terminal for a communication network and a terminal for a communication network.

BACKGROUND

The traffic generated in mobile communication networks such as, for example, GERAN (GSM/EDGE Radio Access Network) and UTRAN (UTMS Radio Access Network) has so far mostly been dominated by services that require human interaction. Examples of such services include, for example, regular speech calls, web-surfing, video-chats, sending MMS, etc. This is also what is anticipated for E-UTRAN (Evolved UTRAN). As a consequence, these networks are designed and optimized primarily for these so-called "Human Type Communication" (HTC) services.

There is, however, an ever-increasing market segment of Machine Type Communication (MTC) services, which do not necessarily need human interaction. MTC may include a very diverse flora of applications. Just to give a few examples, such applications may range from vehicle applications (automatic emergency calls, remote diagnostics and telematics, vehicle tracking etc.) to gas- and power-meter readings. Other examples include network surveillance and cameras.

Requirements put on the serving network by such services will most probably significantly differ from what is provided by today's HTC-optimized mobile networks, as outlined in 3GPP TS 22.368, "Service requirements for machine-type communications".

SUMMARY

In view of the discussion above, there is a need to optimize the support for machine-type communications offered by communication networks, and to improve the possibilities to use MTC applications and devices.

One example function that may be needed for the support of MTC is the ability to contact, or reach, a (large) number of terminals of the network to instruct the terminals in some way. Typically, this might be done by paging each of the terminals. Such a solution, however, requires a lot of signaling to be performed, especially if the number of terminals to contact is large. Thus, there is a risk of congesting the network.

Therefore, there is a need for alternative methods, arrangements, protocols and/or messages for contacting a number of terminals of a network.

It is consequently a general object of the invention to obviate at least some of the above disadvantages and to provide methods, arrangements, protocols and/or messages for contacting a number of terminals of a network.

According to a first aspect of the invention, this is achieved by a method comprising using a single paging operation (e.g. a paging request) for joint paging of a group of terminals.

In some embodiments, the single paging operation comprises sending a single paging message. Thus, according to some embodiments the single paging operation may comprise sending a single paging message addressing several terminals belonging to the same group of terminals.

The terminals may be associated with a communication network and the single paging operation may be performed by one or more nodes of the communication network (e.g. by generating a single paging message or request and transmitting it to the group of terminals). The communication network may be a wireless communication network. The one or more nodes may be one or more of a base station, a base station controller, a network controller or a network server. In yet other embodiments of the invention, embodiments of the invention can be implemented in a NodeB or in an eNodeB.

The joint paging may comprise paging to initiate machine-to-machine (M2M) type communication. The machine-to-machine type communication may comprise updating and/or reconfiguration of the terminals. Additionally or alternatively, the machine-to-machine type communication may comprise transmission by the terminals of certain reports. The certain reports may comprise measurement reports, reading reports, status reports, etc. The certain reports may be received by a communication network and/or a server associated with the network.

The joint paging may also or alternatively comprise paging to initiate human type communication.

The method may comprise associating each of the terminals of the group with a group identifier, and using the identifier to jointly page the group of terminals. In some embodiments, the method comprises including the group identifier in the single paging message. The group identifier may, for example, comprise a specific International Mobile Subscriber Identity (IMSI) for the group, a Temporary Mobile Group Identity (TMGI), or a Mobile Identity having the value "No Identity".

The method may further comprise including additional information in the single paging message. The additional information may comprise one or more of: an indication of a requested response by the terminals, one or more parameters related to a requested response by the terminals, an indication of a type of page, an indication of how a required access by the terminals to the communication network should be performed, one or more parameters related to a required access by the terminals to the communication network, an indication of a particular sub-group of terminals to which the joint page is addressed, one or more specific commands or instructions intended for the terminals. As an additional example, the additional information may comprise one or more parameters related to the timing of when the accesses in response to the paging should be sent by the terminal.

In some embodiments, the method may comprise using a second paging operation for joint paging of a second group of terminals.

In some embodiments, the terminals (also hereinafter referred to as devices or, sometimes, referred to as machines) comprise mobile terminals. For example, the terminals may comprise a portable or handheld mobile radio communication equipment, a mobile radio terminal, a mobile telephone, a pager, a communicator, an electronic organizer, a smartphone, a computer, a notebook, a mobile gaming device, or a (wrist) watch. Alternatively or additionally, the terminals may comprise stationary terminals, for example, a vending machine, a gas meter, a power meter, a network surveillance device, a camera, a sensor, or a stationary computer.

In some embodiments, the group of terminals comprises more than four terminals.

A second aspect of the invention is a method for a terminal comprising receiving the single paging request, and preferably also responding to the single paging request.

The step of responding to the single paging request may comprise updating and/or reconfiguring the terminal. Additionally or alternatively, the step of responding to the single paging request may comprise transmitting certain reports. The certain reports may comprise measurement reports, reading reports, status reports, etc. The certain reports may be received by a communication network and/or a node associated with the network, e.g. a server.

In some embodiments, particulars of the step of responding to the single paging request are preconfigured in each of the terminals. The terminal can then belong to several different groups and the reaction of the terminal may e.g. then be dependent of the particular group being paged. In some embodiments, particulars of the step of responding to the single paging request are dynamic. For example, the particulars of the step of responding to the single paging request may be dynamically depending of additional information included in a single paging message in accordance with some embodiments of the first aspect of the invention.

In some embodiments, the method of the second aspect may further comprise delaying the step of responding to the single paging request by a random period of time.

In some embodiments, the random period of time has a value that falls above a first time period threshold. In some embodiments, the random period of time has a value that falls below a second time period threshold. In some embodiments, the random period of time has a value that falls above a first time period threshold and below a second time period threshold. The first and/or second time period thresholds may have a same value for all terminals in the group or the values of the first and/or second time period thresholds may be terminal specific and/or, optionally, included as additional information in the paging message In some embodiments, the random period of time that the terminal shall wait before performing paging response access, may advantageously be determined according to existing procedures such as described in clause 3.3.1.1.2 of 3GPP TS 44.018 (see e.g. version 9.2.0), but where the value of 'Tx-integer' to use is included as additional information in the paging message according to some embodiments of this invention.

In some embodiments, the second aspect of the invention may additionally have features identical with or corresponding to any of the various features as explained above for the first aspect of the invention.

A third aspect of the invention is a computer program product comprising a computer readable medium, having thereon a computer program comprising program instructions, the computer program being loadable into a data-processing unit and adapted to cause the data-processing unit to execute method steps according to the first aspect of the invention when the computer program is run by the data-processing unit.

A fourth aspect of the invention is a computer program product comprising a computer readable medium, having thereon a computer program comprising program instructions, the computer program being loadable into a data-processing unit and adapted to cause the data-processing unit to execute method steps according to the second aspect of the invention when the computer program is run by the data-processing unit.

A fifth aspect of the invention is a paging message for joint paging of a group of terminals.

The paging message may be for initiating machine-to-machine type communication. The machine-to-machine type communication may comprise updating and/or reconfiguration of the terminals. Additionally or alternatively, the machine-to-machine type communication may comprise transmission by the terminals of certain reports. The certain reports may comprise measurement reports, reading reports, status reports, etc.

The paging message may also or alternatively be for initiating human type communication.

The paging message may comprise a group identifier associated with the group of terminals. The group identifier may, for example, comprise a specific International Mobile Subscriber Identity (IMSI) for the group, a Temporary Mobile Group Identity (TMGI), or a Mobile Identity having the value "No Identity".

The paging message may further comprise additional information. The additional information may comprise one or more of: an indication of a requested response by the terminals, one or more parameters related to a requested response by the terminals, an indication of a type of page, an indication of how a required access by the terminals to the communication network should be performed, one or more parameters related to a required access by the terminals to the communication network, an indication of a particular sub-group of terminals to which the joint page is addressed, one or more specific commands or instructions intended for the terminals. As an example, the additional information may comprise one or more parameters related to the timing of when the accesses in response to the paging should be sent by the terminal.

A sixth aspect of the invention is a paging protocol comprising transmission by a communication network of a single paging request for joint paging of a group of terminals, reception by at least one terminal of the group of the single paging request, and response by the at least one terminal to the single paging request.

In some embodiments, the sixth aspect of the invention may additionally have features identical with or corresponding to any of the various features as explained above for the first and/or second aspect of the invention.

A seventh aspect of the invention is an arrangement for a communication system comprising a processing unit adapted to perform a paging operation for joint paging of a group of terminals. The processing unit may, for example, be a system server, a base station or a base station controller adapted to generate a paging request. In some embodiments, the arrangement further comprises a transmitter adapted to transmit the paging request for joint paging of each of the terminals of the group.

In some embodiments, the seventh aspect of the invention may additionally have features identical with or corresponding to any of the various features as explained above for the first aspect of the invention.

An eighth aspect of the invention is a terminal comprising a receiver adapted to receive the single paging request, and circuitry adapted to respond to the single paging request.

In some embodiments, the eighth aspect of the invention may additionally have features identical with or corresponding to any of the various features as explained above for the second aspect of the invention.

An advantage of some embodiments of the invention is that a plurality of terminals may be paged with a single paging request.

Another advantage of some embodiments of the invention is that congestion of the network is avoided, or at least minimized.

Another advantage of some embodiments of the invention is that the load of the network is decreased.

In particular, an advantage of some embodiments of the invention is that the load on the paging channel (PCH) is decreased.

Another advantage of some embodiments of the invention is that the load that results due to responses to the paging will be distributed more evenly over time. This applies, for example, to the access channel (RACH).

Another advantage of some embodiments of the invention is that machine type commands and updates may be "broadcasted" to many devices rather than explicitly sent to each device. An advantage with this is that even more system resources may be saved.

Another advantage of some embodiments of the invention is that the paging technique may be used for either or both of human type communication and machine-to-machine type communication.

BRIEF DESCRIPTION OF THE DRAWINGS

Further objects, features and advantages of the invention will appear from the following detailed description of embodiments of the invention, with reference being made to the accompanying drawings, in which:

FIG. 1 is a flowchart illustrating example method steps according to some embodiments of the invention;

FIGS. 2A and 2B are flowcharts illustrating example method steps according to some embodiments of the invention;

FIG. 3A is a schematic drawing illustrating mobile terminals connected to one or more base station sites of a communication network, wherein the mobile terminals and/or the communication network may comprise arrangements or perform methods according to some embodiments of the invention;

FIG. 3B is a schematic drawing illustrating terminals connected to a communication server, wherein the terminals and/or the communication server may comprise arrangements or perform methods according to some embodiments of the invention;

DETAILED DESCRIPTION

Figure 4:
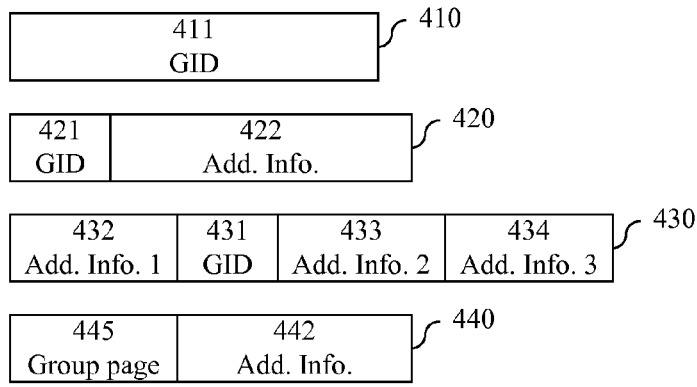
FIG. 4 is a block diagram illustrating example paging messages according to some embodiments of the invention.

In the following, embodiments of the invention will be described where a group of terminals of a communication system may be paged via a single paging request.

It is emphasized that the examples used herein (e.g. relating to GERAN or UTRAN) are merely for illustration and are by no means to be construed as limiting. Contrarily, embodiments of the invention are equally applicable to any communication system where several entities (e.g. terminals) need to be paged.

As mentioned above, an example typical use case that may need to be supported in relation to machine-to-machine type communication is the ability to reach a (large) plurality of devices at the same time (or during a limited period of time). This may be needed e.g. to trigger the devices to transmit reports relating to e.g. measurements, readings, and/or status through the network to a server.

Another example use case may be one where there is a need for an ability to transmit information in the downlink to a plurality of machines/devices. For example, such information may include machine commands and/or different types of updates.

In both of these use cases a (potentially large) number of devices supporting the same MTC service would need to be paged, which would create an excessive load on the network.

Typically, when mobile stations or terminals are to be reached in e.g. the GERAN network according to existing solutions they are paged on the GERAN radio interface through the paging channel (PCH), which is part of the Common Control Channel (CCCH). A few different paging messages are defined in this context.

In one example paging message, a maximum of four individual devices can be reached within the same paging message. The four devices can, however, only be reached with the same paging message if all of them are currently allocated a TMSI (Temporary Mobile Subscriber Identity) or a P-TMSI value. Furthermore, the paging message generally indicates the identity of each of the devices. Thus, such a paging message effectively includes an individual paging request for each of the four devices, and increasing the number of devices that can be paged in a same paging message would inevitably result in longer paging messages.

For other paging messages, the number of devices that can be reached within one paging message is more limited.

It can also be noted that if the location of a device is only known by the network on location/routing area (LA/RA) level (which is typically the case if there has not been any traffic activity lately for the specific device), then paging messages will typically need to be sent for the individual device in all the cells of the LA/RA, which even further congests the network.

With the existing solution (i.e. to send individual paging messages/requests), separate paging messages/requests for each addressed device may also need to be sent over the interface from the Core Network to the Radio Access Network (e.g. over the A/Gb interfaces to the BSC (base station controller) in the case of GERAN).

Thus, with the existing solutions that are available for paging mobile stations in communication networks, each device is paged individually (either via an individual paging message or via an individual paging request within a paging message). Thus, a massive amount of paging messages/requests would be needed in many cases to reach all of the intended devices (e.g. for a MTC service). The resulting signaling load could cause congestion on the radio control channels. Furthermore, the locations of all of the devices would typically not be known on cell level by the network and, therefore, the individual paging messages/requests would in many cases need to be sent out in all cells of the LA/RA.

Since there may also be a need for separate paging messages from the Core Network to the Radio Access Network for each device, the signaling load on the interfaces (e.g. A and/or Gb interfaces for GERAN) would increase drastically when a lot of MTC devices are introduced in a network.

Cases may even occur where it is not realistically possible to effectively reach all of the involved devices with point-to-point pages, e.g. because it would take too long time to reach them all.

Thus, there is a desire to be able to page a group of devices together and not having to page each single device individually.

Some examples of situations when the introduction of MTC services results in a need to page a lot of devices through the network are:

to trigger that the devices send their measurements, readings, and/or status reports to their server through the network to transmit information in the downlink e.g. machine commands, or information to update or reconfigure the devices (e.g. to update text on vending machines).

Embodiments of the invention address this issue and provide solutions for reaching (paging) a number of devices through a network (e.g. the GSM EDGE Radio Access Network (GERAN) network) in an improved manner.

Embodiments of the invention use a single paging operation (e.g. a single paging request and/or a single paging message) for joint paging of a group of terminals. Thus, according to embodiments of the invention several machines (devices) are addressed (or paged) with the same message/request. A number of different detailed solutions to how this may be done will be provided in the following.

Some embodiments of the invention also include a possibility to include additional information in the paging message. Such additional information may, for example, include one or more of the following:

the reason of the page (e.g. a specific action that should be performed by the device), how the machines shall perform their accesses to the network (if needed) in response to the page, if the page only concerns one or more specific subgroups of devices, specific machine commands, etc.

In some embodiments, the devices belong to a common group. Then, a common group identification may be used for achieving a joint page of all of the devices of the group via a single paging message.

Alternatively or additionally, a single paging message is used to page a plurality of devices without the use of a common group identification. For example, one or more group paging messages (e.g. messages specified to be exclusively used for group paging, and possibly specified to be exclusively used for a group paging having a particular purpose) could be used by the network. In such embodiments, a device that supports the group paging functionality may be adapted to always read the group paging messages. Thus, there is no need for a specific group identification in these embodiments.

The way a device should react when receiving a group page can, for example, be:

Configured/hard coded in the device (e.g. "send a specific report"). In these cases, the devices may belong to several different groups with different purposes. The paging of the different groups could thus be set to lead to different actions by the devices.

Dependent on specific information (e.g. included with the paging, for example by including such information in the paging rest octets).

When a lot of devices are paged at the same time there may be an extensive amount of devices that attempting to perform access towards the network at the same (or nearly the same) time. Therefore, embodiments of the invention also include a mechanism to spread the accesses from the devices to the network, triggered by the M2M group page, over a longer period of time. Thus, some embodiments of the invention also provide for improved access to the network for the paged devices when responding to the paging request.

A number of detailed embodiments of the mechanism to perform group paging will now be proposed.

In some embodiments, a specific International Mobile Subscriber Identity (IMSI) for the group (e.g. denoted "M2M group IMSI") is reserved. The machines will then be allocated one (or more) M2M group IMSI(s) in addition to their individual identities. The M2M group IMSI is then allocated to all of the machines that are members of the group. By using the M2M group IMSI as identity in the paging request message, all of the devices of that specific group are paged with the paging message. Transmission of additional information to the devices (e.g. the reason of the page, specific access procedure, indication of affected subgroups, and/or other information) may be included in the rest octets of the paging message. For example, new information elements may be introduced for that in the rest octets of 3GPP TS 44.018 messages "Paging request type 1", "Paging request type 2" or "Paging request type 3".

In some embodiments, a Temporary Mobile Group Identity (TMGI) is allocated for paging of a group of devices. At present, the TMGI values are used for setup of Multimedia Broadcast/Multicast Services (MBMS) sessions to a group of mobile stations. The MBMS mechanism is designed for setup of a pure downlink transmission directed to several mobile stations. In embodiments of the invention, the MBMS mechanism may be reused for group paging. However, since the purpose of the group paging often might be to trigger that the devices perform uplink transmissions, the MBMS solution may not be directly applicable in all cases. Therefore, such embodiments may allocate "M2M group TMGIs" (similar to the M2M group IMSIs in the alternative above) and use them as Mobile Identity in the paging messages in order to page the group of devices with that specific TMGI. Inclusion of other information elements as described earlier (e.g. reason of the page, access procedure, indication of subgroups and other information) may be included by introducing new information elements for that in the rest octets of 3GPP TS 44.018 messages "Paging request type 1", "Paging request type 2" or "Paging request type 3". Alternatively (or additionally) the other information may be included in the Mobile Identity IE of the paging message by updating the 3GPP TS 24.008 Mobile Identity IE definition (see 3GPP TS 24.008 "Mobile radio interface Layer 3 specification; Core network protocols") such that that type of information may be included there when TMGI for group paging is considered.

In some embodiments, the group paging is identified by the introduction of a new Mobile Identity "Type of identity" (e.g. in 3GPP TS 24.008) in order to indicate that the specific paging is a group paging. A group identity may be included to distinguish which group is being paged. Similarly to what has been described above, other information concerning the group page may be included either as part of the Mobile Identity IE (which should then be updated to convey such information) or by introducing new information elements for that information in the rest octets of 3GPP TS 44.018 messages "Paging request type 1", "Paging request type 2" or "Paging request type 3".

In some embodiments, the group paging is performed by sending a paging message with the Mobile Identity set to the existing value "No Identity" and including group paging information in the rest octets of the paging message. An information element with the group identity may be included in the rest octets of 3GPP TS 44.018 messages "Paging request type 1", "Paging request type 2" or "Paging request type 3". Additional information to the devices (e.g. the reason of the page, specific access procedure, indication of affected subgroups and other information) may also be included in the rest octets of the paging message. When a device that supports group paging receives a paging message with Mobile Identity="No Identity" in such embodiments, it should read the rest octets of the paging message in order to determine if the group paging is directed to that device.

In a slightly different embodiment, the same applies as in the above embodiment, but just including the group paging information in the rest octets of the paging message and letting the devices that support group paging always read the paging message rest octets to see if there is a group paging addressed to them. In some cases they will, however, only need to read their own paging group (as in the legacy case). In case an M2M group paging needs to be transmitted but there is no actual paging to send out, the Mobile Identity may be set to "No Identity.

In yet a slightly different embodiment, the same applies as in the above embodiment, but the ETWS mechanism defined in GERAN and the corresponding information elements are reused. A new Warning type Value may be introduced for the parameter Warning-Type for ETWS. The Warning-Type parameter for ETWS is defined in 3GPP TS 23.041 and it is proposed that one of the values that are "Reserved for future use" is used to indicate that the "ETWS message" concerns a group page. Information to distinguish what group of machines are being paged may be sent within information elements in the paging message (typically in the rest octets), e.g. by introducing new information elements for that in the rest octets of 3GPP TS 44.018 messages "Paging request type 1", "Paging request type 2" or "Paging request type 3". Other information that needs to be sent to the machines may also be included in the paging message rest octets.

In some embodiments, a new control message is introduced for (M2M) group paging. The new control message, which it may be possible to send on the Paging/Access Grant CHannels (PCH/AGCH) in order to perform a group paging, may include the same information as described above (e.g. a group identity, reason for the page, access procedure to be used, indication of subgroups, and/or other information, such as e.g. machine commands). The message may be sent on the PCH/AGCH when possible for a certain time in order to reach all the affected devices. The devices may receive the new control message when reading their own paging group.

For some embodiments, in case the machines/devices belong to different paging groups (e.g. of the GERAN control channels), there may be a need to repeat the paging message in order to reach all the paging groups. Even in these embodiments, however, the need to page the machines individually is avoided.

When a lot of devices are paged at the same time (e.g. as with the M2M group paging) there might be an extensive amount of devices that will perform access towards the network at the same time. For instance if there are a lot of devices located in the same GERAN cell, which are paged simultaneously and need to perform access towards the network, there is a high risk for collisions on the radio interface, i.e. on the Random Access Channel (RACH). In existing network solutions, the accesses are already randomized in time in order to avoid collisions. However, that randomization is based on HTC services, where there typically are a more limited number of mobile stations being paged at the same time and where there is a need to respond more quickly to the page. For most MTC use cases the response to a group page is not time critical.

Therefore, embodiments of the invention include a mechanism to spread the accesses from the devices to the network, triggered by the M2M group page, over a longer period of time. For example, a random waiting time may be applied before the first access trial after a paging request and/or after the first access trial has failed and before a second access trial. The random waiting time may be limited in value by an upper and/or lower waiting time threshold. Setting such thresholds properly may achieve the goal to spread the access attempt more. For example, the threshold may be set differently for different devices. In some embodiments, the thresholds themselves are set by a randomization process. In some other embodiments the threshold values are included as additional information in the paging message In some embodiments, the random period of time that the terminal shall wait before performing paging response access, may be determined according to the existing procedures described in 3.3.1.1.2 of 3GPP TS 44.018, but where the value of 'Tx-integer' to use is included as additional information in the paging message.

By applying embodiments of the invention one or more of the following advantages may be achieved:
    The load on the paging channel (PCH) may be significantly decreased since many devices can be addressed simultaneously.
    The load will be distributed more evenly on e.g. the access channel (RACH) in response to the paging.
    Machine type commands and updates can be "broadcasted" to many devices rather than explicitly sent to each device. This will save even more system resources.

It is further emphasized that, even though many of the described embodiments of the invention focus on MTC scenarios, embodiments of the invention are equally applicable to HTC scenarios.

FIG. 1 is a flowchart illustrating an example method 100 according to some embodiments of the invention. In optional method step 110, each terminal of a group is associated with a group identifier (e.g. a M2M group IMSI or any of the other group identifiers mentioned above). In step 120, a paging message (or a paging request within a paging message) to page a group of terminals is generated. The content of the paging message has been exemplified above and will be further exemplified in relation to FIG. 4. In some embodiments, the paging message may include the group identifier of step 110. The paging message may additionally or alternatively include other information as elaborated on above. In some embodiments, no group identifier is included in the paging message. For example, some preconfigured paging messages may always be directed to all terminals and, thus, no group identifier is required. Finally, in step 130, the paging message is transmitted to the terminals. The example method 100 may, for example, be performed by a network side of a communication system.

FIGS. 2A and 2B are flowcharts illustrating example methods 200a and 200b according to some embodiments of the invention. Any of the example methods 200a, 200b may, for example, be performed by a terminal of a communication system.

In step 210a, a paging message is received and read. If the paging message indicates that a response to the paging message requires access to the network, an access attempt may be delayed as indicated in optional step 220a. As discussed above, there may be a delay before the first access attempt and/or before further access attempts if the first attempt fails. The length of the delay may be randomized. To further avoid numerous simultaneous access attempts, the randomization may be conditioned based on one or more thresholds as discussed above. When a successful network access has been achieved, the requested response to the paging message is transmitted in step 230a.

In step 210b, a paging message is received and read. In this example, it is assumed that a response to the paging message requires no access to the network (e.g. if the paging includes an update, reconfiguration, and/or specific machine commands). The requested response to the paging message is performed in step 230b.

FIG. 3A is a schematic drawing illustrating mobile terminals 301, 302, 303, 304, 305 connected to one or more base station sites 320, 330 of a communication network. Each of the base station sites comprises a base station 321, 331 including a transmitter. The communication network comprises the base station sites 320, 330 and a network controller 310 comprising a processing unit 311. The communication network may also comprise further elements (e.g. network servers). The mobile terminals and/or the communication network may comprise arrangements or perform methods according to some embodiments of the invention. For example, the processing unit 311 and the transmitters of the base stations 321, 331 may perform method steps as those described in connection to FIG. 1, and the mobile terminals may perform method steps as those described in connection to FIGS. 2A and/or 2B.

FIG. 3B is a schematic drawing illustrating terminals 360, 370, 380 connected to a communication server 350 comprising a processing unit 351 and a transmitter. The terminals and/or the communication server may comprise arrangements or perform methods according to some embodiments of the invention. For example, the processing unit 351 and the transmitter may perform method steps as those described in connection to FIG. 1, and the terminals 360, 370, 380 may perform method steps as those described in connection to FIGS. 2A and/or 2B.

FIG. 4 is a block diagram illustrating some example paging messages 410, 420, 430, 440 according to some embodiments of the invention.

Paging message 410 includes a group identifier (GID) 411 and no other information. An example scenario when such a message structure may be used is when it is pre-specified what a particular paging message means. For example, there may be only one applicable response to group paging messages specified in a communication system. In such a situation, no additional information is needed to respond to the paging. In another example, there are several possible responses specified to a paging message, but the particular request is conveyed in some other way than by additional information in the paging message. For example, the particular request may be evident by a channel/time slot/frequency carrier/etc used to convey the paging message. Additionally, the terminal can belong to several different groups and the reaction of the terminal may then be dependent of the particular group being paged.

Paging message 420 includes a group identifier (GID) 421 and an additional information field 422. The additional information may, for example, include any of the information as discussed above.

Paging message 430 includes a group identifier (GID) 431 and three additional information fields 432, 433, 434. The additional information may, for example, include any of the information as discussed above.

Paging message 440 includes a field 445 that specifies that the paging message is a group page, but it does not include any group identifier. Such a message may be applicable, for example, if all terminals within reach are to be paged. The paging message 440 also includes an additional information field 442. The additional information may, for example, include any of the information as discussed above. In other embodiments, the additional information field 442 may be left out.

Figure 5:
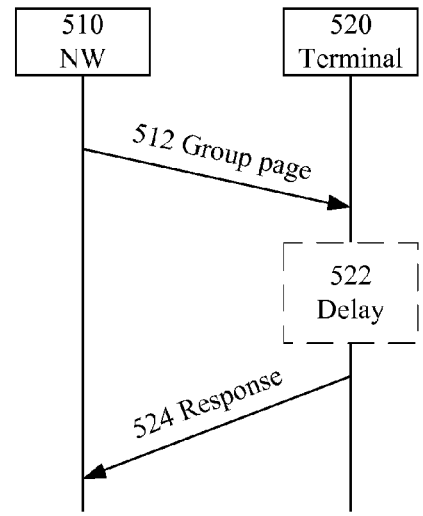
FIG. 5 is a signaling diagram illustrating an example signaling protocol according to some embodiments of the invention.

FIG. 5 is a signaling diagram illustrating an example signaling protocol according to some embodiments of the invention. The protocol is applicable between a network side (NW) 510 and a terminal 520 of a communication system. The network side signals a group page 512 comprising a paging request for a group of terminals that includes the terminal 520. The group page 512 is received by the terminal 520, and the terminal 520 responds accordingly, e.g. by transmitting a response 524 to the network side 510 of the communication system. As explained above (e.g. in connection to FIG. 2A) there may be a deliberate delay 522 between the reception of the group page by the terminal 520 and the transmission of the response.

The described embodiments of the invention and their equivalents may be realised in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a portable or hand-held mobile radio communication equipment, a mobile radio terminal, a mobile telephone, a base station, a pager, a communicator, an electronic organizer, a smartphone, a computer, a notebook, a USB-stick, a plug-in card, an embedded drive, a mobile gaming device, a vending machine, or a (wrist) watch.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, any of the methods shown in any of the FIGS. 1, 2A and 2B.

Figure 6:
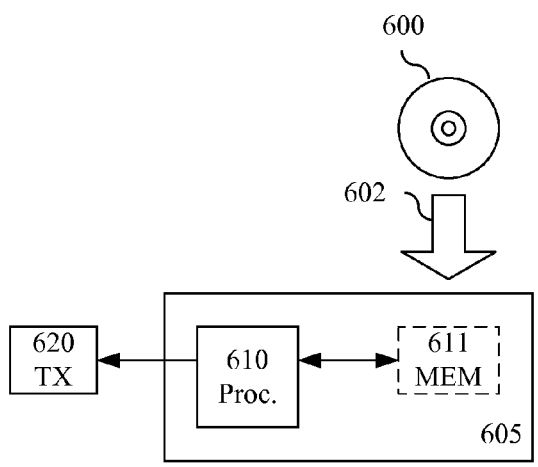
FIG. 6 is a schematic drawing illustrating a processing unit and a computer readable medium according to some embodiments of the invention.

FIG. 6 is a schematic drawing illustrating a computer readable medium in the form of a CD-ROM 600 according to some embodiments of the invention. The CD-ROM 600 may have stored thereon a computer program comprising program instructions. The computer program may be loadable (as shown by arrow 602) into an electronic device 605 comprising a processing unit 610 and possibly a separate memory unit 611. When loaded into the electronic device 605, the computer program may be stored in the memory unit 611. According to some embodiments, the computer program may, when loaded into the electronic device 605 and run by the processing unit 610, cause the electronic device 605 and possibly a transmitter (TX) 620 associated or integral with the electronic device 605 to execute method steps according to, for example, any of the methods shown in any of the FIGS. 1, 2A and 2B. The electronic device may, for example, be comprised in a mobile terminal, a base station, a base station controller or a network server.

It should be emphasized that the term "comprises/comprising" when used in this specification is taken to specify the presence of stated features, integers, steps, or components, but does not preclude the presence or addition of one or more other features, integers, steps, components, or groups thereof.

Furthermore, the invention has been described herein with reference to various embodiments. However, a person skilled in the art would recognize numerous variations to the described embodiments that would still fall within the scope of the invention. For example, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting.

The invention claimed is:

1. A method for contacting a group of terminals within a communication network, said group comprising at least two terminals, the method comprising:
    allocating a specific International Mobile Subscriber Identity for the group to each of the terminals within said group;
    creating a paging message comprising said specific International Mobile Subscriber Identity for the group; and
    further comprising a Tx-integer value, wherein the Tx-integer value is a parameter related to the timing for sending accesses by the terminal in response to the paging message; and
    transmitting the paging message to all terminals within said group by a single paging operation.

2. The method of claim 1, wherein the single paging operation comprises sending a single paging message.

3. The method of claim 1, wherein the method is performed in a node of the communication network.

4. The method of claim 1, further comprising receiving a response from at least one of said terminals.

5. The method of claim 4, wherein said receiving a response comprises receiving a report from said at least one of said terminals.

6. The method of claim 1, further comprising transmitting information to at least one of said terminals for the purpose of updating or reconfiguration, or both.

7. The method of claim 1, wherein the paging message further comprises one or more of: an indication of a requested response by the terminals; one or more parameters related to a requested response by the terminals; an indication of a type of page; an indication of how required access by the terminals to the communication network should be performed; one or more parameters related to a required access by the terminals to the communication network; an indication of a particular sub-group of terminals to which the paging message is addressed; and one or more specific commands or instructions intended for the terminals.

8. A Method in a terminal for a communication network, the terminal belonging to a group of terminals comprising at least two terminals, the method comprising:
    storing a specific International Mobile Subscriber identity for the group, wherein said specific International Mobile Subscriber identity is identical for all devices within said group;
    receiving a paging message comprising said specific International Mobile Subscriber identity for the group, said paging message comprising a Tx-integer value as additional information;
    determining a random period of delay time, depending on the received Tx-integer value;
    transmitting a response to said paging message, wherein said transmitting comprises delaying the transmission according to the determined period of delay time.

9. The method of claim 8, wherein transmitting a response to said paging message comprises transmitting a report.

10. The method of claim 8, further comprising receiving information for updating said terminal or reconfiguring said terminal, or both.

11. An arrangement for contacting a group of terminals for a communication network, said group comprising at least two terminals, the arrangement comprising:
    a processing unit adapted to associate each terminal within the group of terminals with a specific International Mobile Subscriber Identity for the group and to create a paging message including said specific International Mobile Subscriber Identity for the group said paging message further comprising a Tx-integer value, wherein the Tx-integer value is a parameter related to the timing for sending accesses by the terminal in response to the paging message; and
    a transmitter adapted to transmit the paging message to each of the terminals within said group.

12. The arrangement of claim 11, whereby the processing unit is part of a network controller or a system server.

13. A terminal for a communication network belonging to a group of terminals comprising at least two terminals, the terminal being allocated a specific International Mobile Subscriber identity for the group identical for all of the at least two terminals within said group, the terminal comprising:
    a receiver adapted to receive a paging message, said paging message including a Tx-integer value as additional information;
    circuitry for transmitting a response to said paging message;
    circuitry adapted to determine a random delay time period, depending on the received Tx-integer value; and
    a delay unit adapted to delay the transmission of said response according to the determined random delay time period.

* * * * *

UNITED STATES PATENT AND TRADEMARK OFFICE
CERTIFICATE OF CORRECTION

PATENT NO. : 8,437,782 B2  
APPLICATION NO. : 13/504017  
DATED : May 7, 2013  
INVENTOR(S) : Bergqvist et al.

Page 1 of 1

It is certified that error appears in the above-identified patent and that said Letters Patent is hereby corrected as shown below:

In the Claims:

In Column 14, Line 1, in Claim 8, delete "Method" and insert -- method --, therefor.

Signed and Sealed this  
Twenty-fourth Day of September, 2013

Teresa Stanek Rea  
*Deputy Director of the United States Patent and Trademark Office*